United States Patent [19]

Hamatani et al.

[11] Patent Number: 4,536,619
[45] Date of Patent: Aug. 20, 1985

[54] RINGING SIGNAL DETECTION CIRCUIT

[75] Inventors: Fumikazu Hamatani; Kouichi Funabasama, both of Kawasaki, Japan

[73] Assignee: Nitsuko Limited, Kawasaki, Japan

[21] Appl. No.: 565,629

[22] Filed: Dec. 27, 1983

[30] Foreign Application Priority Data

Dec. 28, 1982 [JP] Japan ................................ 57-227728

[51] Int. Cl.$^3$ ............................................. H04M 1/00
[52] U.S. Cl. ................................................ 179/84 R
[58] Field of Search .............. 179/84 R, 84 T, 99 LC, 179/84 SS, 84 A, 84 C; 328/138

[56] References Cited

U.S. PATENT DOCUMENTS 3,753,130  8/1973  Pezzutti ........................... 328/138 X
4,049,916  9/1977  Danner ......................... 179/84 R X
4,390,843  6/1983  Betts et al. ..................... 179/84 R X Primary Examiner—Gene Z. Rubinson
Assistant Examiner—James L. Dwyer
Attorney, Agent, or Firm—Roberts, Spiecens & Cohen

[57] ABSTRACT

A ringing signal detection circuit for a subscriber's apparatus which is connected to a telephone office line together with an attached telephone set. An incoming signal on the telephone line is converted to a pulse signal with a repetition frequency twice the incoming signal by a full-wave rectifier and a differentiating circuit. The pulse signal is applied to a retriggerable monostable multivibrator through a photo-coupler and an inverter. The time period of a metastable state of the multivibrator by one trigger pulse is selected to be longer than the break period in the dial pulse signal but longer than a half cycle of the ringing signal. Therefore, the multivibrator is maintained at the high level for a longer time period at a time when the incoming signal is the ringing signal than the time when the incoming signal is the dial pulse signal. Therefore, the ringing signal can be detected from the time period when the high level signal is continuously maintained and distinctly distinguished from the dial pulse signal. The time period of the high level signal can be detected by the use of a clock pulse generator, an AND gate to which the high level signal and the clock pulse are applied, and a pulse counter connected to the output of the AND gate. The time period is, thus, represented by the number counted in the counter.

8 Claims, 6 Drawing Figures

RINGING SIGNAL DETECTION CIRCUIT

BACKGROUND OF THE INVENTION

This invention relates to ringing signal detection circuits for subscriber's apparatus each being used together with a telephone set for an office line.

In the present specification, the terms of the subscriber's apparatus includes a facsimile device, a telephone automatic answering device, a key-telephone-system control unit, a direct connection telephone set and all other apparatus or devices which has ringing signal detection circuits and which are used together with telephone sets to common office lines.

In those apparatus, when a dialling device is operated at the attached telephone set for calling another party, the ringing signal detection circuit of the subscriber's apparatus and the attached telephone set are connected to a common office line. Therefore, the dial pulse signal sent out from the attached telephone set is also applied to the ringing signal detection circuit of the apparatus.

For example, the key-telephone-system control unit has a ringing signal detection circuit which is connected to an office line. When a ringing signal is detected on the office line, the control unit operates to drive a bell, indicator lamps and other devices for noticing the call. When one of key telephone sets in the system is connected to the office line for calling another subscriber, the telephone set is also connected to the ringing signal detection circuit. Therefore, a dial pulse signal sent out from the telephone set to the office line is also applied to the ringing signal detection circuit.

A facsimile device is also connected to a telephone office line together with a telephone set. In reception of a call by another party, the apparatus detects the ringing signal incoming on the telephone line and automatically responds to the call. When calling another subscriber's apparatus, the subscriber operates a dialling device of an attached telephone set to send out the dial pulse signal to the telephone office line. Then, the dial pulse signal is also applied to the apparatus connected to the telephone office line together with the telephone.

In order to prevent such a subscriber's apparatus to erroneously operate in response to the dial pulse signal sent out from the attached telephone set connected to the office line together with the subscriber's apparatus, the ringing signal detection circuit of the subscriber's apparatus must be provided with a function for distinctly distinguishing the ringing signal from the dial pulse signal.

In many public telephone systems, a sinusoidal AC signal is used for the ringing signal. The sinusoidal ringing signal has usually a frequency of 16 Hz and a voltage of, typically, 65 volts (V). The ringing signal is sent out for a time period of one second and thereafter pauses for a time period of two or three seconds, and the sending for one second and the pause for two seconds are repeated.

While, the dial pulse signal is generated by switching on and off the office telephone line, to which a DC voltage of 48 volts (V) is usually applied, by operation of the dialling device of the telephone set. The repetition frequency of the dial pulse signal is usually 10 Hz.

As described above, since the ringing signal and the dial pulse signal are different in voltage level, a known ringing signal detection circuit is made to detect the voltage of the ringing signal.

However, when the dial pulse signal arrives at a telephone office through the telephone office line, an electromotive force is induced due to an inductance of the exchanging unit in the telephone office. The induced voltage signal is superposed on the dial pulse signal and is applied to the calling party's subscriber's apparatus. Since the voltage of the dial pulse signal on which the induced voltage signal is superposed is nearly equal to the voltage of the ringing signal, the detection circuit of the calling party's subscriber's apparatus may erroneously detect a ringing signal.

In another known method, a capacitor is used in the detection circuit so as to be charged by the incoming signal. Since the ringing signal and the dial pulse signal are different from one another in the voltage and the frequency, capacitor voltages charged by respective signals. Therefore, the ringing signal is detected and distinguished from the dial pulse signal by the capacitor voltage as charged. However, since the capacitor is not always charged to a constant level by ringing signals and since the capacitor voltage charged by the ringing signal is often nearly equal to the capacitor voltage charged by the dial pulse signal due to the above-described induced voltage signal, it is quite difficult to predetermine a capacitor voltage level for identifying the ringing signal.

SUMMARY OF THE INVENTION

It is an object of this invention to provide a ringing signal detection circuit for a subscriber's apparatus connected to an office line together with a telephone set wherein the ringing signal can be detected and distinctly distinguished from a dial pulse signal sent out from the telephone set.

It is another object of this invention to provide such a ringing signal detection circuit which is simple in circuit formation and realizes the above-mentioned object.

According to this invention, a ringing signal detection circuit for a subscriber's apparatus connected to a telephone office line together with a telephone set having a rotary dialling device for sending out a dial pulse signal is obtained wherein the incoming ringing signal is detected and is reliably distinctly distinguished from the dial pulse signal from the attached telephone set.

The ringing signal detection circuit comprises first means for receiving an incoming signal on the telephone office line and producing a pulse signal with a repetition frequency twice the incoming signal. Second means is coupled to an output of the first means and produces a high level signal at an output thereof in response to each pulse form the first means. The second means maintains the high level signal continuously during a time period when pulses are applied thereto with a pulse interval smaller than a predetermined break period in the dial pulse signal. Third means is connected to the output of the second means and detects a time period during which the output of the second means is maintained at the high level. The third means provides a ringing signal detection output at a time when the detected time period is equal to a time period predetermined in relation to the ringing signal.

The third means can comprise a clock pulse generator means for generating clock pulses at a predetermined repetition frequency higher than the dial pulse signal, and fourth means coupled with the output of the second means and the clock pulse generator means. The fourth means permits the clock pulses to pass therethrough a time period when the output signal from the second means is maintained at the high level. Counter means is connected to the output of the fourth means and counts clock pulses passing through the fourth means during a fixed time period, or a time period when the output of the second means is maintained at the high level. The ringing signal is detected and is distinctly distinguished from the dial pulse signal in dependence of the difference of numbers counted at the counter means in response to inputs of respective signals.

Further objects, features and other aspects of this invention will be understood from the following detailed description of preferred embodiments referring to the accompanying drawings.

DETAILED DESCRIPTION OF THE PREFERRED EMBODIMENTS

Figure 1:
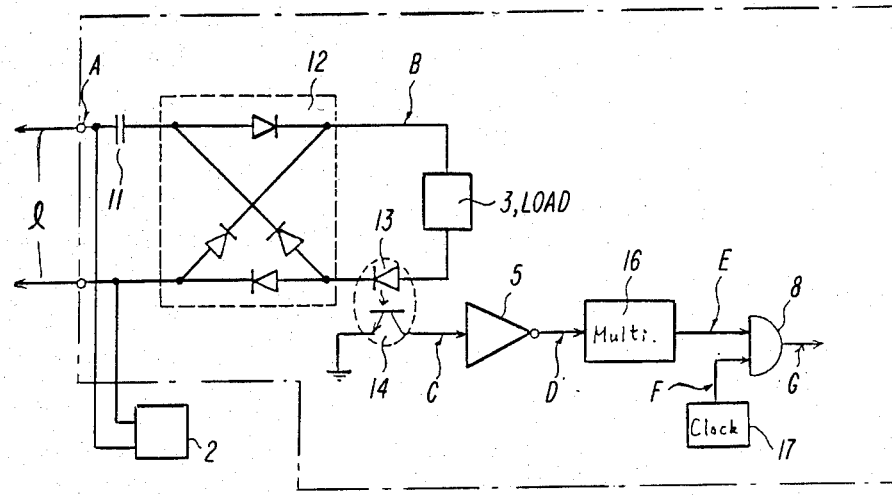
FIG. 1 is a view for illustrating a circuit diagram of an embodiment according to this invention.

Referring to FIG. 1, a subscriber's apparatus 1 such as a facsimile device is connected to an office line 1 together with a telephone set 2. The apparatus 1 includes a ringing signal detection circuit, a load impedance 3 such as a resistor connected to office line and other functional portion. The functional portion is not shown because the present invention relates not to the functional portion but to the ringing signal detection circuit.

The ringing signal detection circuit comprises a DC-cut capacitor 11 and a rectifier circuit 12 having four diodes, which are connected in the connecting circuit between the office line 1 and load impedance 3. A light emission diode portion 13 of a photocoupler is also connected in the circuit connecting rectifier circuit 12 and data input and output circuit 3. An output of a photo-transistor portion 14 of the photo-coupler is connected to an inverter 15, an output of which is coupled with a retriggerable mono-stable multivibrator 16 having a predetermined metastable time period. As well known in the art, the retriggerable mono-stable multivibrator is a type wherein when an input pulse is applied to the multivibrator which is in its mestastable condition, the multivibrator is retriggered to start a new metastable state. The metastable state is selected to be longer than a half cycle of the ringing signal but shorter than a break period in the dial pulse signal. An output of multivibrator 16 is applied to one of the input terminals of an AND gate 18, while clock pulses from a clock pulse oscillator 17 are applied to the other input terminal of AND gate 18.

Operation of the ringing signal detection circuit will be described hereinafter, referring to FIGS. 2 and 3 in addition to FIG. 1.

Figure 2:
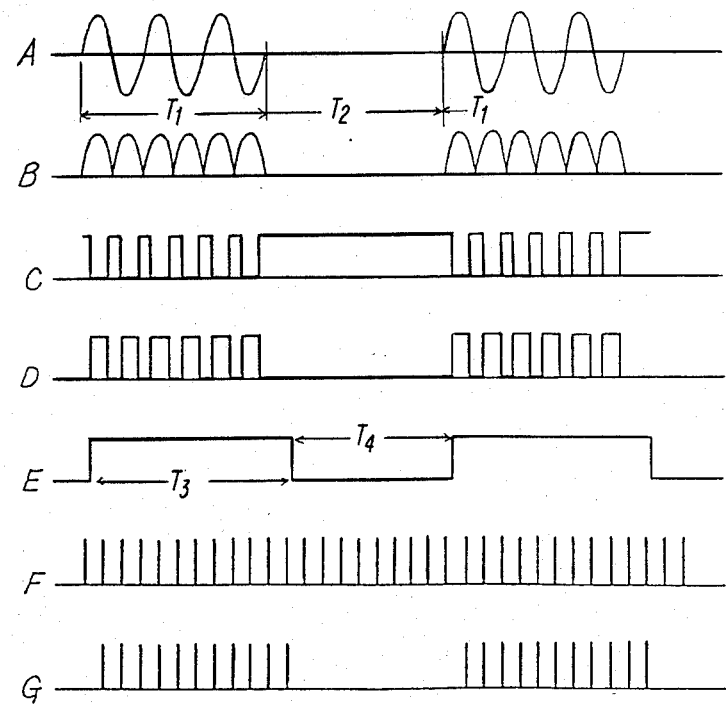
FIG. 2 is a view for illustrating signal waveforms at various points in the circuit of FIG. 1, to explain operation of the circuit in response to the incoming ringing signal.

When the ringing signal as shown at A in FIG. 2 comes into the apparatus 1 through office line 1, the signal is full-wave rectified at rectifier circuit 12 after passing capacitor 11, so that the full-wave rectified current flows through data input and output circuit 3 and light emission diode 13. The full-wave rectified current as shown at B in FIG. 2.

The ringing signal is periodically sent out with intervals. The sending time $T_1$ is usually one second while the interval $T_2$ three seconds, as described above. Although the frequency of the ringing signal is usually 16 Hz, three-cycle wave is drawn for simplification of the drawings.

Light emission diode 13 is luminescent by the current flowing therethrough, and photo-transistor 14 turns on when the light from light emission diode 13 exceeds a threshold level of the photo-transistor. Accordingly, pulse signal as shown at C in FIG. 2 presents at the output of photo-transistor 14

It will be readily understood that the repetition frequency of the pulse signal is twice the frequency of the ringing signal because light emission diode 13 is driven by the full-wave rectified current.

The pulse signal is phase-inverted at inverter 15, and the phase-inverted signal, as shown at D in FIG. 2 is applied to retriggerable mono-stable multivibrator 16.

As described above, multivibrator 16 is a retriggerable one and its metastable time period is selected to be longer than a half cycle of the ringing signal but shorter than a break period of the dial pulse signal (that is a time interval between adjacent two pulses in the dial pulse signal). Therefore, multivibrator 16 is triggered by a first pulse from inverter 15 and is sequentially retriggered by subsequent pulses as shown at D in FIG. 2. When no pulse is inputted to multivibrator 16 over a time period longer than the metastable state as designed, the multivibrator returns to its stable state. Accordingly, the output of multivibrator 16 is maintained at a high level during a time period of $T_3$, which is a fixed period corresponding to the ringing signal sending time period $T_1$.

Since multivibrator 16 is maintained at the metastable state for a time period after triggered by an input pulse as described above, the time period $T_3$ is slightly longer than $T_1$.

During a time interval $T_2$ of each pause of the ringing signal, no pulse is not applied to multivibrator 16, so that the output of the multivibrator 16 is maintained at a low level during a time period $T_4$ corresponding to the time interval $T_2$.

Figure 3:
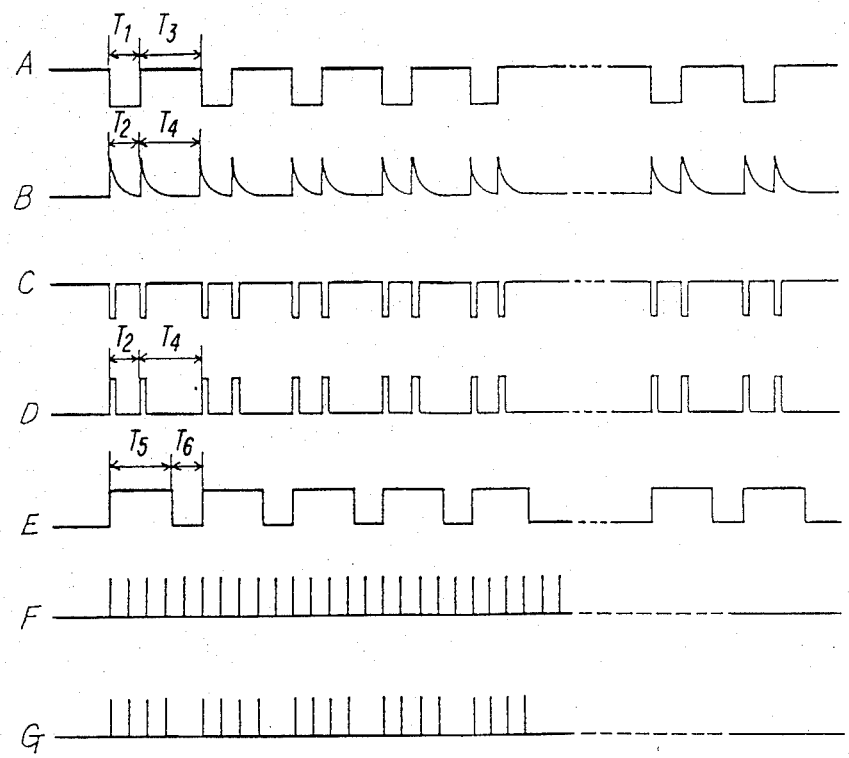
FIG. 3 is a view for illustrating signal waveforms at various points in the circuit of FIG. 1, to explain operation of the circuit in response to the incoming dial pulse signal.

Referring to FIG. 3, when a dial pulse signal as shown at A is applied to the ringing signal circuit in FIG. 1, each pulse is differentiated by capacitor 11 and load impedance 3 and the differentiated signal is rectified by full-wave rectifier circuit 12. Therefore, current pulses as shown at B in FIG. 3 flow through light emission diode 13.

In connection with the current pulses, it will be understood that two pulses are produced in response to a dial pulse. The two pulses are spaced from one another by a time period $t_2$ corresponding to the pulse width $t_1$ of a dial pulse. When the dial pulse signal includes a plurality of pulses, for example, 10 pulses in response to dialling operation of a number "0", a time interval $t_3$ between adjacent two dial pulses, or the break period, is constant. The dial pulse signal is determined to have usually a repetition frequency of 10 Hz as described above. Therefore, a time interval $t_4$ between a pair pulse generated from a dial pulse and another pair pulse generated from a subsequent dial pulse is corresponding to, and equal to, the time interval $T_3$.

The pulse signal at B in FIG. 3 flows through light emission diode 13, and therefore, a corresponding pulse signal is obtained at a collector of photo-transistor 14, as shown at C in FIG. 3. The signal is phase inverted at inverter 15 to a signal as shown at D in FIG. 3, and is applied to multivibrator 16.

Multivibrator 16 is repeatedly triggered by input pulses of D in FIG. 3. However, since the metastable time period of multivibrator 16 is longer than a half cycle of the ringing signal but shorter than a break period $t_3$, no trigger pulse is applied to multivibrator 16 which is still in the metastable condition after it is triggered by two pulses generated by a dial pulse. Therefore, the output of multivibrator 16 is maintained at high level during a time period $t_5$ corresponding to the pulse width $t_1$ of one dial pulse and is at low level during a time period $t_6$ corresponding to the break period $t_3$ of the dial pulse signal. The high level period $t_5$ is longer than $t_1$ and the low level period is shorter than $t_3$ because of the metastable time period of the multivibrator.

Comparing the time period $T_3$ in FIG. 2 and the time period $t_5$, $T_3$ is quite longer than $t_5$ because $T_3$ is nearly equal to the sending time period (usually one second) of the ringing signal while $t_5$ being nearly equal to the pulse width ($t_1$) of one dial pulse.

Therefore, the ringing signal can be detected and distinctly distinguished from the dial pulse signal by utilizing the time difference between $T_3$ and $t_5$.

In order to detect the time period of the high level output of multivibrator 16, clock pulse generator 17 and AND gate 18 are used.

The output signal of multivibrator 16 is applied to one input of AND gate 18 to open the AND gate by the high level signal. While, clock pulse signal, as shown at F in FIG. 2 and in FIG. 3, is also applied to the other input of AND gate 18, so that clock pulses are outputted from AND gate 18 during a time period when AND gate 18 is open. This means that the high level period of the output signal from the multivibrator 16 is represented by number of clock pulses passing through AND gate 18.

The pulse signal obtained from AND gate 18 during each period $T_3$ and another pulse signal obtained during each period $t_5$ are shown at G in FIG. 2 and FIG. 3, respectively.

The number of pulses obtained during the time period $T_3$ is larger than that during the timer period $t_5$. Therefore, the ringing signal can be detected and distinctly distinguished from the dial pulse signal by employing a pulse counter at the output of the AND gate 18.

Figure 4:
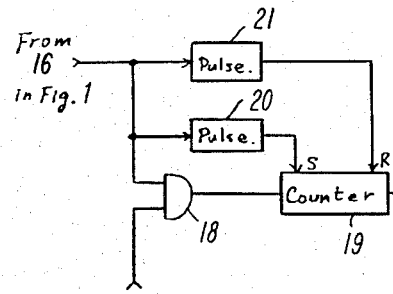
FIG. 4 is a view of a block diagram of an embodiment for obtaining a ringing signal detection signal, which is used together with the circuit of FIG. 1.

Referring to FIG. 4, a pulse counter 19 is connected to the output of AND gate 18. Two pulse forming circuits 20 and 21 are connected to the output of multivibrator 16. Circuit 20 is for producing a pulse corresponding to the rising end of the high level signal from multivibrator 16, and the pulse is applied to counter 19 as a start pulse. Circuit 21 generates a reset pulse for counter 19 in correspondence to the lowering end of the high level signal from multivibrator. Thus, counter 19 counts up pulses applied thereto from AND gate 18 during a time period from the start pulse to the reset pulse.

Figure 5:
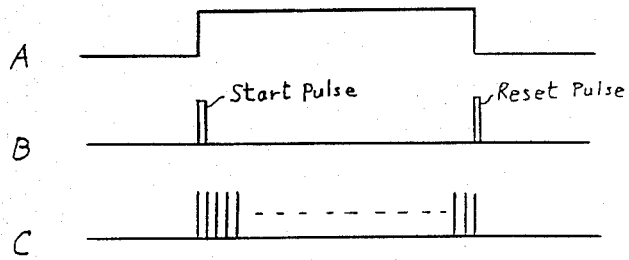
FIG. 5 is a view for illustrating waveforms at different points in the circuit of the embodiment in FIG. 4.

The output signal of multivibrator 16, the start and reset pulses and pulses counted up at counter 19 are shown at A, B and C, respectively, in FIG. 5.

When the incoming signal to the ringing signal detection circuit of FIG. 1 is the ringing signal, the time period of the high level signal continued from multivibrator 16 is $T_3$ which is a constant time period, as described above in connection with FIG. 2. Therefore, the number counted at counter 19 from the start pulse to the reset pulse is the number M of clock pulses passing through AND gate 18 during the time period $T_3$ and is constant.

While the dial pulse signal is applied to the circuit of FIG. 1, multivibrator 16 maintains a high level signal for a time period $t_5$ in response to one dial pulse, as described above in connection with FIG. 3. The time period $t_5$ is quite shorter than the time period $T_3$. Accordingly, the pulse number N counted at counter 19 during the time period $t_5$ is smaller than the number M.

Therefore, if the counter 19 is made to an output signal at a time when the count number is M, the output signal represents that the ringing signal is inputted to the subscriber's apparatus 1 of FIG. 1.

Figure 6:
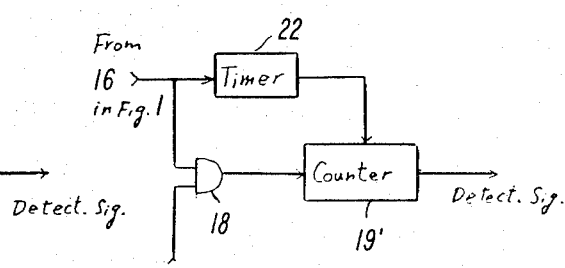
FIG. 6 is a view of a block diagram of another embodiment for obtaining a ringing signal detection signal, which is used together with the circuit of FIG. 1.

Referring to FIG. 6, according to another arrangement, a similar counter 19' is connected to the output of AND gate 18. The counter 19' is controlled by a timer 22 to operate during a fixed time period. The timer 22 is connected to the output of multivibrator 16 to be started by the rising end of the high level signal. If the operating time is set equal to the above-described time period $T_3$, M pulses are counted up at counter 19' during the operating time $T_3$ of timer 22 at a time when the ringing signal is applied to the subscriber's apparatus. While, when the dial pulse signal is applied to the subscriber's apparatus, the number of pulses counted up at counter 19 during the timer operating time $T_3$ is smaller than M, because clock pulses do not pass through AND gate 18 during the time interval $t_6$ (in FIG. 3) corresponding to each break period $t_3$ in the dial pulse signal.

Therefore, if counter 19' is made to produce an output signal at a time when the count number is M, the ringing signal detection signal is obtained from the counter 19'.

It will be understood that the timer operating timer can be set shorter than $T_3$ but longer than one period $(t_1 + t_3)$ of the dial pulse signal. According to this, the count number at a time when the ringing signal detection signal is outputted is changed.

As to the repetition frequency of the clock pulses, since at least one clock pulse must be present during a low level duration $t_6$ (FIG. 3) of the output signal of multivibrator 16 according to a break period $t_3$ of the dial pulse signal, it is selected to be sufficiently higher than the dial pulse repetition frequency.

What is claimed is:

1. A ringing signal detection circuit for a subscriber's apparatus connected to a telephone office line together with a telephone set having a rotary dialling device for sending out a dial pulse signal, which comprises;

first means receiving an incoming signal on the telephone office line and producing a pulse signal with a repetition frequency twice that of the incoming signal:

second means coupled to an output of said first means and providing a high level signal at an output thereof in response to each pulse from said first means, said second means maintaining the high level signal continuously during a time period when pulses are applied thereto with a pulse interval smaller than a predetermined break period in the dial pulse signal; and third means for detecting a time period during which the output of said second means is maintained at a high level, said third means providing a ringing signal detection output at a time when the detected time period is equal to a predetermined time period in relation to the ringing signal, said third means comprising:

clock pulse generator means for generating clock pulses at a predetermined repetition frequency higher than the dial pulse signal;

fourth means coupled with the output of said second means and said clock pulse generator means for permitting the clock pulses to pass therethrough during a time period when the output signal from said second means is maintained at the high level; and counter means coupled with an output of said third means and counting up the clock pulses passing through said fourth means, said counter means providing the ringing signal detection output at a time when a counter number in said counter means is equal to a value predetermined in relation to the ringing signal.

2. The ringing signal detection circuit as claimed in claim 1, which further comprises fifth means for producing a start pulse for said counter means in response to a rising end to the high level of the output signal from said second means, sixth means for producing a reset pulse for said counter means in response to a lowering end of the high level signal from said second means, said counter means providing the ringing signal detection output.

3. The ringing signal detection circuit as claimed in claim 1, which further comprises timer means for controlling operation of said counter means within a predetermined time period, said timer means being actuated by a rising end of the high level signal from said second means.

4. The ringing signal detection circuit as claimed in claim 1, wherein said first means comprises a capacitor means and full-wave rectifier means.

5. The ringing signal detection circuit as claimed in claim 4, wherein said first means further comprises a photo coupler means having a light emission means and photosensitive means, said light emission means being connected to an output of said full-wave recitifier means.

6. The ringing signal detection circuit as claimed in claim 5, wherein said second means comprises a retriggerable monostable multivibrator means having a predetermined metastable time period which is longer than a half cycle of the ringing signal but shorter than the break period of the dial pulse signal.

7. The ringing signal detection circuit as claimed in claim 6, wherein said photosensitive means comprises a photo-transistor of NPN type, and an inverter means is connected between an output of said photo-transistor and an input of said retriggerable monostable multivibrator means for phase-inverting the output signal of said photo-transistor.

8. The ringing signal detection circuit as claimed in claim 1, wherein said third means comprises an AND gate means.

* * * * *